United States Patent Office 3,846,292
Patented Nov. 5, 1974

3,846,292
EJECTOR AERATED OXIDATION DITCH FOR WASTE TREATMENT
Archie R. Lecompte, Jr., Neenah, Wis., assignor to Kimberly-Clark Corporation, Neenah, Wis.
Continuation of application Ser. No. 138,906, Apr. 30, 1971, which is a continuation-in-part of application Ser. No. 75,620, Sept. 25, 1970, both now abandoned. This application Oct. 5, 1973, Ser. No. 403,904
Int. Cl. C02c 1/06
U.S. Cl. 210—14                               5 Claims

ABSTRACT OF THE DISCLOSURE

Oxidation ditch system for the removal of B.O.D. and suspended solids from aqueous waste by using ejectors to aerate the liquid and also as the sole propelling force to move the liquid around a closed-loop circuit. Advantages include reduced horsepower requirements and the use of deeper, high-volume ditches without reduction in aeration effectiveness.

---

This application is a continuation-in-part of my copending application S.N. 75,620 filed September 25, 1970.
This is a continuation of application Ser. No. 138,906, filed Apr. 30, 1971, now abandoned, which is a continuation-in-part of application Ser. No. 75,620 filed Sept. 25, 1970, now abandoned.

DESCRIPTION OF THE INVENTION

The related problems of waste water treatment and effective water quality control are of increasing criticality to municipalities and industry as well as the public in general. As the population expands, the need for manufactured products grows correspondingly which inherently results in the production of greater amounts of waste materials for treatment or disposal. Much of this waste has historically been directed to lakes and streams, but it is now recognized that improved equipment and methods for treating the waste must be developed to protect our water courses.

Broadly, systems for the treatment of aqueous wastes may be classified as either anaerobic or aerobic. Anaerobic processes involve the utilization of oxygen in its combined form. They typically require a long residence time and are accompanied by stagnant conditions and the generation of malodorous gases. Aerobic processes, in contrast, are characterized by oxygenation to promote the growth of microorganisms which feed on the particulate waste and break it down into harmless components, and the resulting biomass usually accumulates to form a sludge. My invention relates to aerobic systems for the treatment of aqueous waste.

Within the broad definition of aerobic processes set forth above there have been devised a number of treatment systems. Examples are aerated lagoons and activated sludge installations. All include, as a minimum, an inlet for the aqueous waste, a basin of sufficient volume to provide a desired retention time, an outlet for the treated liquid, and some provision for maintaining the level of dissolved oxygen high enough to support microorganism growth and thereby prevent stagnant, anaerobic conditions from developing. Where the waste material is deficient in essential nutrients such as nitrogen or phosphorous, for example, they may be added to sustain the microorganisms.

Some oxygen may be supplied by simple exposure to the atmosphere. For example, where the dissolved oxygen is depleted by the microorganisms, an oxygen deficit results between the concentration of oxygen in the water and that which the water can accommodate in equilibrium with the partial pressure of oxygen in the atmosphere. As long as this deficiency exists, oxygen will continue to diffuse into the water. For this arrangement to operate aerobically, however, large, shallow basins are necessary to provide sufficient surface exposure and retention time. In many cases the time and/or land area available is insufficient and additional sources of oxygen must be used.

An aerated lagoon is a similar arrangement where aeration devices are added to increase the transfer of oxygen into the aqueous waste. The resultant sludge either overflows to the receiving water body with the water or settles to the bottom and is removed from time to time. This requirement for sludge removal is a disadvantage since it can result in costly downtime.

Activated sludge installations also include the general components of inlet, basin, outlet, and aeration device. However, they provide in addition some system for keeping the aqueous waste in motion and substantially preventing the sludge from settling out. A separator device such as a clarifier is usually employed outside of the basin to divide the sludge from the treated liquid. The sludge, which contains biomass (i.e. microorganisms), is commonly returned in whole or in part to the basin to help treat fresh incoming waste. As a result, activated sludge installations contain greater amounts of active microorganisms and can operate at reduced retention times.

An oxidation ditch is a type of activated sludge installation wherein the basin forms a continuous, substantially closed course for liquid movement. A rotating brush positioned across the direction of liquid flow and partially submerged has commonly been used both for oxygenation and to move the liquid around the course. The quantity of waste liquid which can be treated for a given area has been limited by the depth of these ditches, commonly about 4–5 feet. Greater depths are generally uneconomical due to the horsepower required for a brush large enough to move the liquid. In addition brushes of greater diameter would be required to effectively treat waste material at the bottom of the ditch. Since the brush operates by rotating and causing a spray and turbulence, it is limited to a location at or near the liquid surface and limits the depth of the liquid which may be treated. For these reasons the oxidation ditch system of aqueous waste treatment has heretofore been principally restricted to low volume facilities.

It is a primary object of my invention to provide an improved oxidation ditch capable of relatively high volume treatment.

More particularly it is an object of my invention to provide such an improved oxidation ditch that operates with reduced power requirements and increased oxygenation efficiency when compared with known oxidation ditch aeration installations.

Other objects of my invention include the substantial reduction in problems such as icing in cold weather, fogging, and foaming which have resulted from the use of conventional oxidation ditch systems.

Still other objects and advantages of my invention will become apparent upon reference to the detailed description and to the drawings, in which, FIG. 1 is a flow chart illustrative of typical aqueous waste treatment processes employing an oxidation ditch which may benefit from my invention;

The use of an oxidation ditch in the form of a shallow, continuous circuit for the treatment of aqueous waste is old. The use of ejectors in activated sludge systems and the like for supplying oxygen to aqueous waste is also old. However, I believe that my improved combination of a relatively deep oxidation ditch with ejectors as the sole means for aeration and movement of the liquid is novel and produces beneficial and unexpected results.

Prior to my invention those skilled in this art believed that oxidation ditches required large rotating brushes to produce sufficient liquid velocity to prevent the sludge from settling and to adequately mix the liquid and solids. In most cases this velocity consideration has been a limiting design factor and resulted in over-oxygen (more oxygen than necessary for treatment). While over-oxygenation is not harmful, it represents an unnecessary expenditure of horsepower and is, therefore, costly. It has been considered that other aeration devices such as ejectors, impellers, or the like would not be able economically to generate relatively high velocities and good mixing throughout the ditch. Contrary to these expectations, the ejector-oxidation ditch combination of my invention operates with sufficiently high velocities for good mixing substantially throughout a properly designed ditch at lower horsepower inputs than are required for similar systems utilizing a rotating brush.

Figure 1:
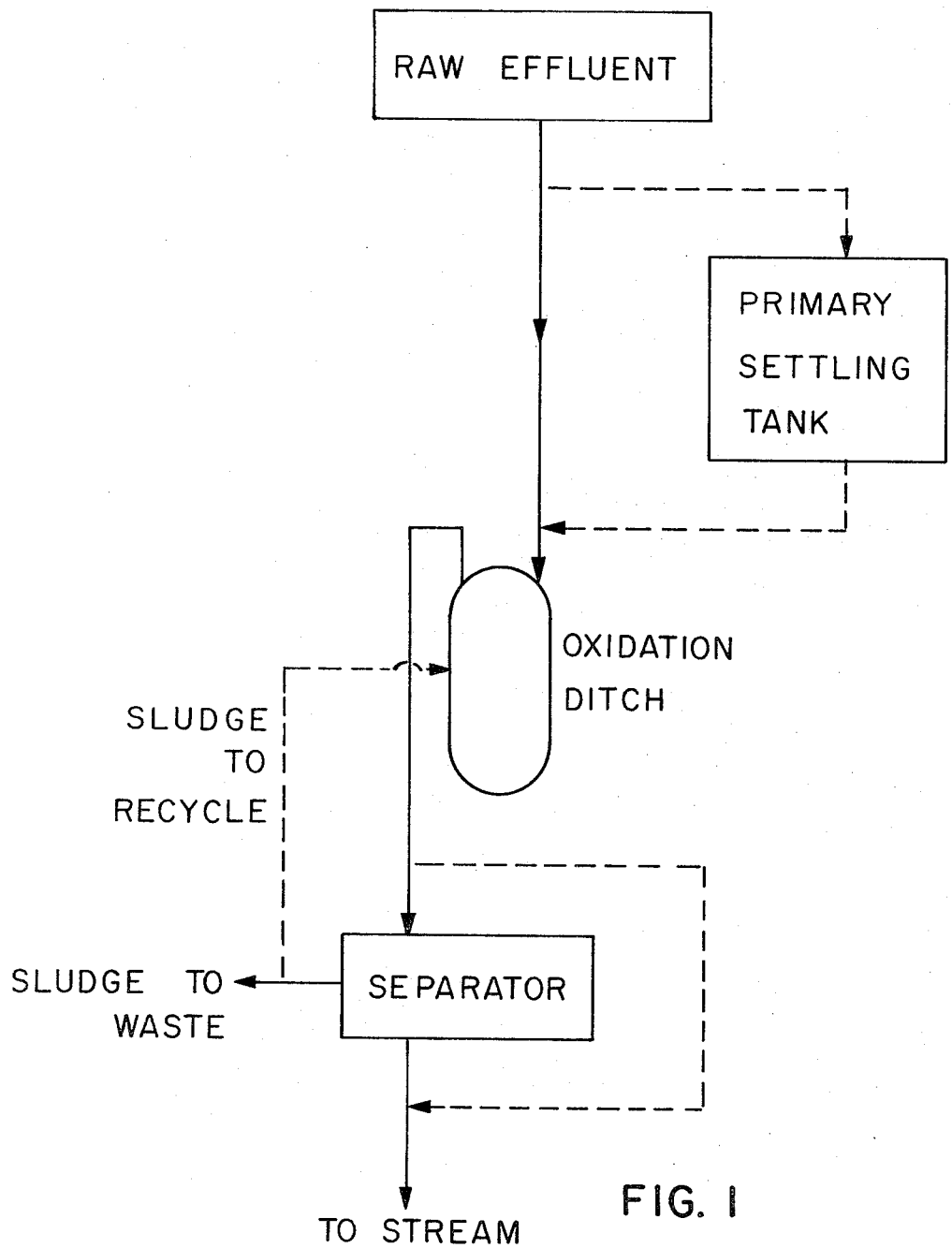

Turning now to the drawings, the generalized flow chart of FIG. 1 shows that raw effluent may be directed to the oxidation ditch. Alternatively it may undergo primary treatment in a settling tank or the like where heavier particulate matter is removed. From the oxidation ditch the treated liquid is usually sent to a separator where the sludge is eliminated. In some cases where the amount of sludge is small, a separator may not be required. The clarified liquid is released to a stream or other body of water, and the sludge is wasted or recycled in whole or in part to the oxidation ditch. Depending upon the type of waste being treated, the amount of sludge recycled may vary between 25% and 125% by volume of the incoming raw waste and, preferably, within the range of from 40% to 100%.

Figure 2:
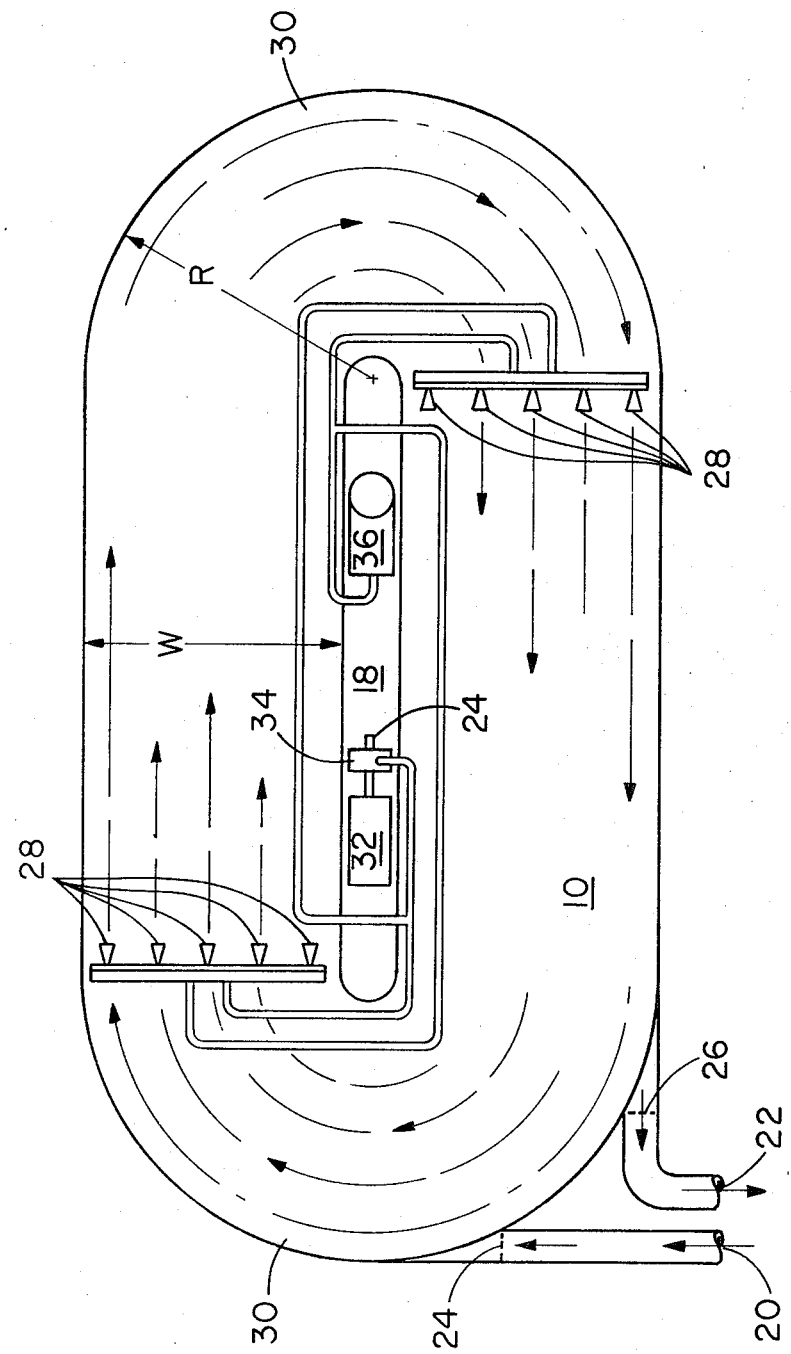
FIG. 2 illustrates in plan view an oxidation ditch constructed in accordance with preferred embodiments of my invention.
Figure 3:
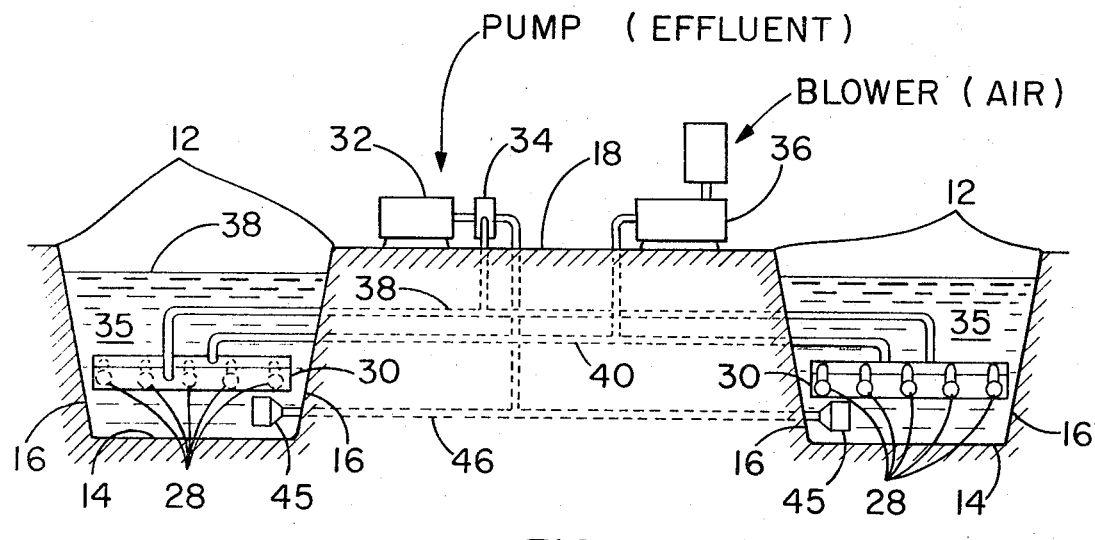
FIG. 3 is a cross-sectional view of such a preferred ditch.

Referring now to FIGS. 2 and 3, the operation of the oxidation ditch will be described in greater detail. The ditch 10 defines a continuous, substantially closed course for liquid movement. The top 12 of the ditch is preferably well above the ditch bottom 14 and accommodates a liquid depth of up to 20 feet or more. The sides 16 preferably form a trapezoid in cross-section with bottom 14 for ease of construction. Ditch 10 may be unlined or lined with materials now used such as poured concrete, shortcrete, or elastomeric membranes.

A preferred configuration for ditch 10 is illustrated in FIG. 2 as an oval or racetrack shaped channel having island 18. The liquid flow path is preferably around the channel and free from obstructions to flow other than are unavoidably presented by the equipment to be used. A relatively wide turning radius R of about 3 times the channel width W is preferred for improved flow. For purposes of illustration a reduced radius R which is not to scale is shown in FIG. 2.

The actual location of inlet 20 and outlet 22 is not critical and may be at one end as shown. From a contacting and reaction kinetics viewpoint, the introduction of influent (inlet 20) should be located just downstream from the zone of effluent draw off (outlet 22). This allows every fraction of waste a certain minimum contacting and mixing time prior to possible washout from the system and insures against short circuiting. In large ditches this minimum contacting time could be as great as one hour. Unlike conventional flow-through systems, however, influent is not continuously introduced into a given portion of liquid since the ditch contents are constantly moving past the influent zone providing dilution and resistance to shock loading. As illustrated the influent may flow tangentially over wier 24 and the effluent tangentially over wier 26 to minimize interruptions in the flow pattern.

One or more ejectors 28 can be used depending upon the size of the ejector and quantity of water liquid to be treated. It is contemplated, however, that most systems will require a plurality of ejectors which are preferably combined to form one or more ejector banks 30. In the illustrated embodiment where two banks 30 are used having five ejectors 28 in each, the banks are preferably located at the beginning of each straight portion of the ditch for optimum hydraulic flow around the bends. Motor 32 coupled to pump 34 provides for circulation of the ditch contents 35 through the ejectors 28. Blower 36 can be used to supply air to the ejectors 28 which is released as bubbles for mixing with the ditch contents. While a single pump-blower set is illustrated, it will be understood that a pump and blower may be used for each ejector bank 30 if desired. Also, the location of the pump 34 and blower 36 is not critical although I believe that island 18 is a convenient, central location which can reduce the amount of piping used when a single set of pump and blower is to supply a plurality of ejector banks 30.

The particular depth at which ejectors 28 are submerged within the ditch contents 35 is not critical so long as they are sufficiently below the surface 38 of channel contents 35 to prevent rapid dissipation of the energy from the ejectors. In general, the deeper the ejectors are placed, the greater will be the bubble contact time and the effective oxygenation. Also, greater depths tend to increase the shear forces on the bubbles as they enter the ditch contents, further subdividing them and increasing the surface area for oxygenation. For these reasons it is preferred that ejectors 28 be placed at or near the bottom 14 of ditch 10.

Ejector banks 30 may be supported within the ditch 10 by any suitable means such as attachment to sides 16. Piping from pump 34 and blower 36 is indicated generally as 38 and 40, respectively, and may be arranged in any convenient manner. The number of ejectors 28 in each bank 30 should be sufficient to impact the waste liquid substantially completely across the ditch 10 as the flows from the ejectors expand and overlap a short distance downstream from ejector bank 30. All the ejectors in each bank are preferably directed along lines parallel to the desired direction of flow and spaced at equidistant locations across ditch 10. In this manner the ejectors preferably provide the sole motivating force to mix and move the ditch contents 35 about its circuitous path.

Figure 4:
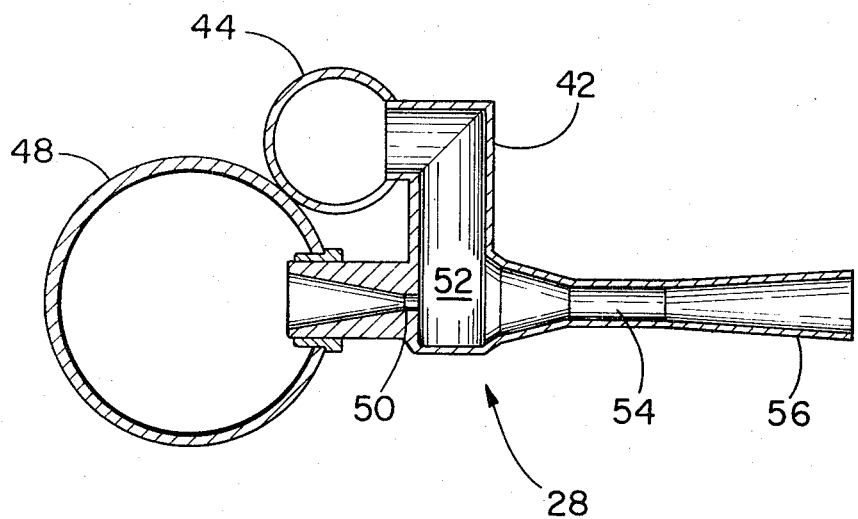
FIG. 4 is a detailed view in section of an ejector assembly for use in my preferred oxidation ditch system.

FIG. 4 illustrates one embodiment of an ejector system. A channel 42 of the ejector 28 is in communication with header conduit 44 and receives therefrom a flow of air, oxygen, or the like at a relatively high velocity generated by blower 36 through piping 40 (FIGS. 2 and 3). Liquid is directed from the ditch itself via intakes 45 located within contents 35 and piping 46 through pump 34 and piping 38 to liquid header conduit 48. Header 48, in turn, feeds the liquid to each eductor 28 through its constriction 50 to mix with incoming gas at chamber 52. The velocity of the air-liquid mixture then is increased by travel through constriction 54 from which it is ejected through nozzle 56 into the ditch 10. The liquid passing at high velocity transversely of channel 42 creates a vacuum condition which aids air movement into the flowing liquid providing for a jet of air and liquid from the nozzle 56. The nozzle diameter increases slightly towards the outlet to accommodate the volume of the combined air and liquid streams while still maintaining high velocity.

The high velocity air-liquid mixture jet impacts the liquid mass in the ditch urging it into motion. The combined action of the ejectors creates circuitous movement around the ditch as well as contacting the air with the liquid and occasioning good mixing action.

Ejectors which I have found to be adapted for use in my system include Model 67 JA manufactured by Penberthy Division of Houdaille Industries, Inc. Others are made by Schute and Koerting Co.

Reference may be had to U.S. application S.N. 75,619 filed Sept. 25, 1970, by Mikkel G. Mandt and assigned to the assignee of the present invention for a floating ejector arrangement that is particularly useful for my invention. In accordance with relevant aspects of that disclosure the pump and blower are attached to a float supporting submerged ejectors. Advantages include reduced piping and resultant head loss as well as increased flexibility since the unit may be moved to achieve desired results simply by shifting the float.

While it is not intended that my invention be limited to any particular theory, I believe that the oxidation ditch carries out both physical and biochemical processes. A minor portion of the organic matter present undergoes direct chemical oxidation while the rest is stabilized by the biochemical activities of the microorganism. The microorganisms feed on the organic matter and form biologically degradable and nondegradable products. These products combine with the microorganisms to form a floc that can be settled out in subsequent treatment as earlier described. The efficiency of the system is dependent upon good flocculation which relates to a high level of microorganism activity. An adequate supply of oxygen sustains the highly active microorganisms in the combination of my invention producing good flocculation with a clear effluent from a final clarifier. B.O.D. removal of greater than 90% is obtainable as will be shown by the examples below.

EXAMPLE I

This example demonstrates the reduced horsepower requirements resulting from the use of my invention when compared with a rotor brush as the commonly used means for aerating and moving waste-containing liquids in an oxidation ditch.

The ditch utilized for this example was a test facility which, of necessity, compromised optimum flow design for flexibility. It comprised a channel 15 feet wide and 11 feet deep having vertical sides and generally of the shape illustrated in FIG. 1. The straight sections were 76 feet long, and a 7 foot wide, rotating brush with a 10 h.p. motor was installed in a constriction at the midpoint of one of the straight sections. Because the bends were relatively sharp, turning guides were used to reduce the effect of the change in direction on the flow pattern. At a water depth of 10 feet the ditch capacity was 225,000 gallons. For the purposes of this example the ditch was filled with water.

Air and water pressures along conduits to and from the ejectors, pump, and blower were monitored. Air flow was measured with a rotameter, water flow with a magnetic flowmeter. The ejectors weer suspended from a float which was constructed of wood and empty drum and maintained in position by guywires equipped with Dilan strain gauges to measure the thrust generated by the jets. There were 10 Penberthy 67 JA ejectors mounted on air and water headers. A Gould centrifugal pump with a 7.5 h.p. motor provided water to the ejectors while a Roots-Connorsville positive displacement blower provided air. The water flow and pressure were controlled by a DeZurik concentric V-port valve, and a bypass with valving controlled air flow pressure.

Horsepower determinations for the rotating brush were based on ammeter readings and previous data as well as the manufacturer's information. Ejector horsepower determinations were based on theoretical calculations from air and water flows and pressure differentials.

The net air horsepower was calculated using the adiabatic work expression for a compressible gas. Since the work performed on the gas is equal to the product of the head and the weight of the gas handled, the adiabatic horsepower is $$Hp. = \frac{wH_{ad}}{550} = \left(\frac{k}{k-1}\right) \frac{wRT_1}{550} \left[\left(\frac{p_2}{p_1}\right)^{(k-1)/k} - 1\right]$$

where, $w$=weight of gas, lb./sec.
$H_{ad}$=adiabatic head, ft.
$R$=gas constant
$T_1$=inlet temperature, °K.
$P_1$=inlet pressure, p.s.i.a.
$P_2$=outlet pressure, p.s.i.a.
$k$=ratio of specific heat at constant pressure to that at constant volume.

for air with $k=1.395$ and $P_1$=atmospheric,

Hp.=0.226 where Q is volume air rate $$\left[Q\left(\frac{P_2}{P_A}\right)^{0.283} - 1\right]$$

Water horsepower was calculated from the expression, $$Hp. = \frac{\Delta p_{jet} + Q_m}{55}$$

Where $\Delta p_{jet} = p_m - p_h$ = average jet manifold pressure minus hydrostatic head at ejector submergence in ft. of water
$Q_m$=flow rate of water, lb./sec.

The standard oxygen transfer rate was determined in the following manner, $$\frac{dO_2}{dt_{std.}} = (-K_{(20°)})(D_{std.})(H_2O \text{ mass})$$

Where $K$=the reaeration constant determined from the slope of a plot of dissolved oxygen deficit vs. time elapsed and corrected to 20° C.
$D$=dissolved oxygen deficit
$t$=elapsed time The oxygenation capacity (OC) was then expressed in terms of the oxygen transfer divided by the sum of pump and blower horsepower. In the case of the rotating brush the no-load power consumption (rotor turning freely in air) was subtracted from the power consumption as measured by the recording wattmeters and line ammeter readings.

Velocity measurements were taken with either a Gurley No. 622 velocity current meter or a Marine Advisors Model B–1a Savonius current speed sensor with a Model 56b current meter detector and a Model 5–14a current direction detector. Measurements were made at locations throughout the channel length, width and depth. Mean ditch velocity was calculated by averaging the values for each run.

For this example, the ejectors were submerged at a depth of about 9 feet and canted at a slight downward angle of about 7°. The following table summarizes the results of tests conducted during four such runs.

TABLE I

|  | Run number | | | |
|---|---|---|---|---|
|  | A | B | C | D |
| Parameter | Rotor | Rotor | Ejector | Ejector |
| Water depth (ft.) | 10.2 | 10.5 | 10.2 | 10.3 |
| Water differential pressure Δp, p.s.i. |  |  | 8.3 | 7.5 |
| Air flow: |  |  |  |  |
| S.c.f.m. |  |  | 77 | 155 |
| P.s.i.g. |  |  | 3.4 | 3.9 |
| Power input, hp./MG | 13.0 | 26.1 | 12.8 | 16.9 |
| Theoretical OC, #O$_2$/hp.-hr. | 2.48 | 3.48 | 4.97 | 5.77 |
| OC based on manufacturer's data: |  |  |  |  |
| O$_2$/shaft hp.-hr. | 3.16 | 4.00 |  |  |
| (Shaft input, hp./MG) | (11.6) | (23.7) |  |  |
| Mean subsurface velocity, f.p.s. | 0.23 | 0.49 | 0.42 | 0.46 |
| Approximate horizontal thrust (uncorrected) (lbs.) |  |  | 78 | 83 |
| Rotor submergence, in. | 3.5 | 6.75 |  |  |

This comparison demonstrates, I believe, that the use of my invention results in substantial benefits in terms of horsepower savings. Comparing Runs A to C and B to D, for example, theoretical oxygenation capacities are shown which are about 200% and 165%, respectively, of those obtained with the rotating brush. When manufacturers' data are considered, the corresponding percentages are about 140% and 133%, respectively. In terms of mean velocity, my invention provides substantially higher results when Runs A and C with nearly equal power inputs are compared and only slightly less comparing Runs B and D where the rotor power input was about 155% that applied to the ejectors. Actual OC values for other systems such as diffuse and surface aerators generally range from about 1.0 to 2.5 lbs. $O_2$ per horsepower hour. However other considerations such as maintaining solids in suspension may dictate use of more power in these systems. In contrast, my invention allows a greater degree of separate control of motive power through the pump and oxygen transfer through the blower.

A velocity profile for a typical ejector run where the power input was 15.3 Hp./mg., water depth was 10 feet, and ejectors were placed at a depth of 9 feet, appears as Table II. The mean velocity of this run was 0.4 f.p.s. Although the results demonstrate the ability of my system to generate relatively high velocities throughout the channel at low horsepower inputs, I believe that improvements in design such as removing the rotor constriction and increasing the turning radius will result in even higher velocities. At equivalent power inputs, mean velocities of 0.5 to 0.6 f.p.s. can be expected based on calculations for better designs.

The preferred velocity is one that is great enough to maintain the solids in suspension and provide proper mixing, but slow enough for the desired retention time for the ditch contents. Generally, velocities in the range of from about 0.3 f.p.s. to about 1.0 f.p.s. are satisfactory depending upon the solids size and density.

TABLE III

| | |
|---|---|
| Retention/flow | 29.8 hours/28.0 g.p.m. |
| Mixed liquor suspended solids | 4,479 mg./l. |
| Air rate | 21.5 s.c.f.m. |
| Dissolved oxygen | 0.3–5.9 mg./l. |
| Sludge volume index | 142 ml./g. |
| Sludge wasted | 161.5 lbs./day |

TABLE IV

| | Influent | Effluent | Reduction |
|---|---|---|---|
| Suspended solids | 569 mg./l. | 38.4 mg./l. | 93.3%. |
| B.O.D. | 206 mg./l. | 12.3 mg./l. | 94.0%. |
| Turbidity, JTU's (Jackson Turbidity Units). | | 75 | |

From the above it can be seen that my unique oxidation ditch aeration arrangement provides very high B.O.D. removal and good suspended solids removal. Thus, the advantages of oxidation ditch treatment are made available for locations of reduced area by means of deep channel aeration. Other advantages of my invention result from the fact that the moving parts are submerged. No spray is produced which would be subject to icing in cold weather or fogging at other times. Also, the tendency to foam is reduced since the bubbles are released at a relatively deep location and move downstream to give a layered effect instead of piles of foam.

While the invention has been described with reference to specific embodiments, it is not to be restricted thereto. In its broadest aspects, the invention may be variously embodied within the scope of the appended claims.

I claim:

1. A system for treating waste liquid containing settleable solids and B.O.D. comprising,
   an oxidation ditch for confining and retaining the waste liquid and defining a continuous, substantially closed flow path through which the confined liquid is moved and providing for a liquid depth of at least about 10 feet,

TABLE II

| | Outside edge | | | Outside turning guide | | | Middle | | | Inside turning guide | | | Inside edge | | |
|---|---|---|---|---|---|---|---|---|---|---|---|---|---|---|---|
| | 3' | 6' | 9' | 3' | 6' | 9' | 3' | 6' | 9' | 3' | 6' | 9' | 3' | 6' | 9' |
| Beginning of turn following ejectors | 0.6 | 0.6 | 0.6 | 0.6 | 0.6 | 0.7 | | | | 0.2 | 0.2 | 0.5 | 0.3 | 0.3 | 0.4 |
| End following ejectors | 0.6 | 0.6 | 0.6 | 0.2 | 0.2 | 0.2 | | | | 0.2 | 0.3 | 0.2 | 0.3 | 0.4 | 0.7 |
| End of turn following ejectors | 0.5 | 0.6 | 0.5 | 0.3 | 0.2 | 0.1 | | | | 0.6 | 0.5 | 0.5 | 0.4 | 0.4 | 0.2 |
| One-quarter point side opposite ejectors | 0.5 | 0.5 | 0.5 | | | | 0.2 | 0.3 | 0.2 | | | | 0.2 | 0.3 | 0.1 |
| Three-quarter point-side opposite ejectors | 0.4 | 0.5 | 0.5 | | | | 0.5 | 0.6 | 0.6 | | | | 0.2 | 0.2 | 0.2 |
| Beginning of turn approaching ejectors | 0.5 | 0.5 | 0.5 | 0.7 | 0.7 | 0.6 | | | | 0.3 | 0.2 | 0.2 | 0.1 | 0.3 | 0.1 |
| End approaching ejectors | 0.5 | 0.5 | 0.6 | 0.4 | 0.4 | 0.4 | | | | 0.2 | 0.1 | 0.4 | 0.2 | 0.3 | 0.4 |
| End of turn approaching ejectors | 0.5 | 0.5 | 0.6 | 0.3 | 0.3 | 0.4 | | | | 0.5 | 0.5 | 0.6 | 0.4 | 0.5 | 0.5 |
| Following ejectors | 0.6 | 0.4 | 0.3 | | | | 0.3 | 0.3 | 0.3 | | | | 0.7 | 0.3 | 0.3 |

EXAMPLE II

In this example an oxidation ditch was formed by a chest 48 feet long and 13 feet deep having two channels 6'7" wide separated by a midfeather. The walls were vertical and tile lined.

Two manifolds of three Penberthy Model 67 JA ejectors each were mounted on the bottom at the upstream end of the midfeather in each channel with the centerlines of the ejectors 12" off the floor.

Preliminary treatment of the incoming waste was accomplished by straining on a 3' by 3' horizontal screen of ¼-inch mesh. From the screen the stream flowed to the suction of the pump supplying one of the manifolds while the other manifold was supplied with mixed liquor from a separate pump. Air was supplied through a rotameter to one or both manifolds as desired. A sludge-blanket clarifier was used for final suspended solids removal.

Table III lists operating data while Table IV summarizes the results obtained under conditions of about 30 hours retention time.

a plurality of ejectors for aerating the waste liquid in the ditch to reduce the B.O.D. thereof and for simultaneously moving the waste liquid through the flow path, the ejectors being constructed and arranged so that they are solely capable of circulating the waste liquid throughout the ditch at a velocity of at least 0.3 foot per second to maintain the settleable solids in suspension, said ejectors each comprising a housing having a waste liquid inlet for receiving a stream of pressurized waste liquid, a high velocity waste liquid nozzle in communication with said waste liquid inlet, an air inlet for receiving air, a mixing chamber in communication with said waste liquid nozzle and said air inlet and a discharge outlet for discharging a high velocity waste liquid-air jet, said ejectors being arranged to discharge the waste liquid-air jets at least about 9 feet below the surface of the waste liquid in the oxidation ditch and in the direction of movement thereof, 2. The system of claim 1 wherein said ejectors are located near the bottom of said ditch.

3. A method of treating waste liquid, which contains settleable solids and B.O.D., to reduce the B.O.D. while maintaining the settleable solids in suspension comprising the steps of, confining and retaining the waste liquid to be treated in an oxidation ditch defining a continuous, substantially closed flow path through which the confined liquid can be circulated, the ditch providing for a liquid depth of at least about 10 feet, producing separate streams of pressurized waste liquid and of air, combining said streams of liquid and air in a plurality of ejectors to produce a series of high velocity liquid-air jets, discharging said high velocity jets from said ejectors into the waste liquid in the ditch at a depth of at least about 9 feet below the surface thereof and in the direction of the waste liquid flow path to aerate the waste liquid in the ditch and to simultaneously circulate the waste liquid through said flow path, the ejectors being constructed and arranged so that they are solely capable of circulating the waste liquid throughout in the ditch at a velocity of at least 0.3 foot per second.

4. The method as defined in claim 3 including the step of producing said streams of pressurized liquid by pumping and circulating liquid from the ditch through a conduit and to said ejectors.

5. The method as defined in claim 3 including the step of pressurizing said streams of air before combining same with said streams of pressurized liquid in said ejectors.

References Cited

UNITED STATES PATENTS

| | | | |
|---|---|---|---|
| 3,579,439 | 5/1971 | Meiring et al. | 210—195 |
| 3,206,176 | 9/1965 | Peterson | 210—14 |
| 2,606,150 | 8/1952 | Thorp | 210—63 |
| 3,281,304 | 9/1966 | Valdespino et al. | 210—14 |
| 3,397,789 | 8/1968 | Valdespino | 210—195 |
| 3,505,212 | 4/1970 | Huger | 210—14 |
| 3,336,016 | 8/1967 | Schreiber | 210—220 |
| 3,510,110 | 5/1970 | Klein | 259—107 |

FOREIGN PATENTS

| | | | |
|---|---|---|---|
| 942,754 | 11/1963 | Great Britain | 261—Dig. 75 |

SAMIH N, ZAHARNA, Primary Examiner

F. F. CALVETTI, Assistant Examiner

U.S. Cl. X.R.

210—60, 63, 84, 195, 220, 512

PO-1050
(5/69)

UNITED STATES PATENT OFFICE
CERTIFICATE OF CORRECTION

Patent No. 3,846,292   Dated November 5, 1974

Inventor(s) Archie R. LeCompte, Jr.

It is certified that error appears in the above-identified patent and that said Letters Patent are hereby corrected as shown below:

Column 1, please delete lines 24 and 25. "This application is a continuation-in-part of my copending application S.N. 75,620 filed September 25, 1970."

Column 3, line 12, "over-oxygen" should read -- over-oxygenation --.
Column 3, line 48, "shortcrete" should read -- shotcrete --.
Column 4, line 2, "water" should read -- waste --.
Column 5, line 51, "weer" should read -- were --.
Column 6, line 22, change the second equal sign "=" to a minus sign -- - --.
Column 7, line 17, "dictate use" should read -- dictate the use --.
Column 9, claim 3, line 25, delete the word "in".

Signed and sealed this 7th day of January 1975.

(SEAL)
Attest:

McCOY M. GIBSON JR.
Attesting Officer

C. MARSHALL DANN
Commissioner of Patents